(12) United States Patent
Dumke et al.

(10) Patent No.: US 6,293,300 B1
(45) Date of Patent: Sep. 25, 2001

(54) VALVE ASSEMBLIES

(75) Inventors: Robert A. Dumke, Kenosha; Robert D. Zimmerly, Pleasant Prairie, both of WI (US)

(73) Assignee: Alfa Laval Inc., Kenosha, WI (US)

( * ) Notice: Subject to any disclaimer, the term of this patent is extended or adjusted under 35 U.S.C. 154(b) by 0 days.

(21) Appl. No.: 09/660,677

(22) Filed: Sep. 13, 2000

(51) Int. Cl.⁷ ............... F16K 11/10; F16K 51/00
(52) U.S. Cl. ............ 137/312; 137/613; 137/637.2
(58) Field of Search .................. 137/240, 312, 137/597, 614.17, 614.18, 614.19, 637.2, 613

(56) References Cited

U.S. PATENT DOCUMENTS

| | | | |
|---|---|---|---|
| 4,368,753 | * 1/1983 | Brakelmann et al. | 137/312 |
| 5,085,241 | * 2/1992 | Mieth | 137/240 |
| 5,152,320 | * 10/1992 | Zimmerly | 137/625.5 |
| 5,226,449 | 7/1993 | Zimmerly | 137/240 |
| 5,232,023 | * 8/1993 | Zimmerly | 137/637.2 |
| 5,275,201 | 1/1994 | Zimmerly | 137/597 |
| 5,441,079 | 8/1995 | Zimmerly | 137/637.2 |
| 5,450,878 | * 9/1995 | Zimmerly | 137/861 |
| 5,469,880 | * 11/1995 | Zimmerly | 137/240 |
| 5,575,305 | * 11/1996 | Mieth | 137/240 |
| 5,775,363 | * 7/1998 | Hammond . | |
| 6,014,983 | * 1/2000 | Sondergaard et al. | 137/312 |
| 6,056,003 | * 5/2000 | Madsen et al. | 137/240 |

FOREIGN PATENT DOCUMENTS

4243111 * 6/1994 (DE) ................... 137/241

* cited by examiner

Primary Examiner—George L. Walton
(74) Attorney, Agent, or Firm—Ryan Kromholz & Manion, S.C.

(57) ABSTRACT

A valve assembly includes a valve body formed of a cylinder having upper and lower ends with an inlet port at one end, an outlet port on an opposite end and at least one side outlet port. An annular ring element has upper and lower ends on which are formed upper and lower valve seats, respectively, the ring being sealed around its periphery on each end to the valve body. A central portion of the ring connecting the upper and lower ends has at least one and preferably about 6 to 8 openings therethrough in fluid flow communication with the side outlet port.

An actuator assembly fitted in the cylinder includes actuators, concentrically fitted actuator rods valve stems and valve plugs for opening and closing the two valve ports by engaging the valve seats on opposite sides of the ring. The rod for the upper valve seat is in the form of a hollow cylinder concentric and coaxial with the actuator rod for the lower seat, the first and second rods being independently actuatable. An independently controllable actuator assembly in the side outlet port includes a valve actuator, an actuator rod attached to and a valve plug for closing the outlet port. The outlet port, when open is in flow communication with a drain open to the atmosphere whereby liquids can be drained by gravity from the space between the annular ring and the cylinder when the side outlet is open.

16 Claims, 5 Drawing Sheets

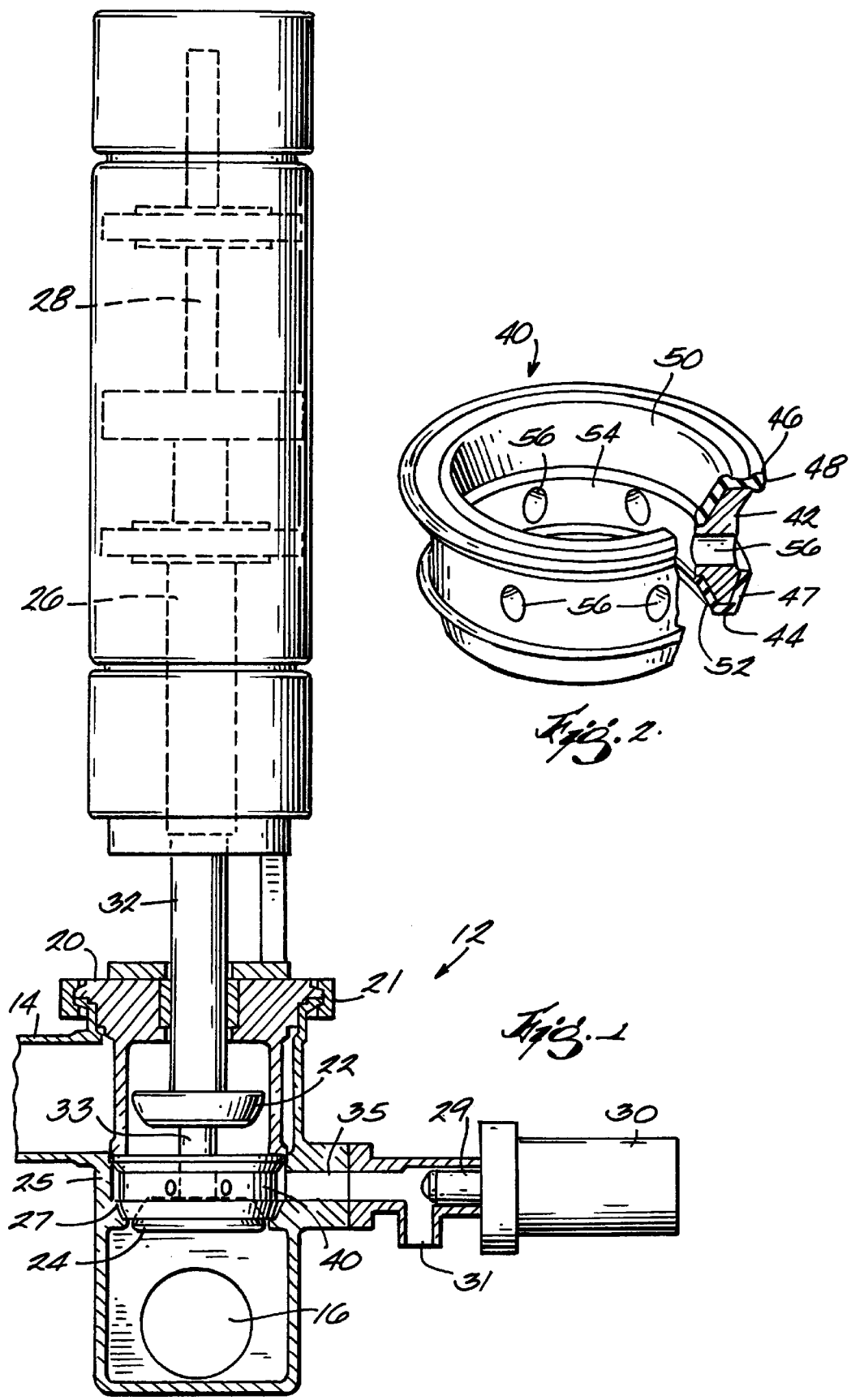

VALVE ASSEMBLIES

BACKGROUND OF THE INVENTION

This invention relates to valves for controlling the flow of fluids, and particularly to block-and-bleed valves assembled together to form manifolds for controlling the flow of fluids, especially liquid foods or beverages, from multiple sources to multiple delivery destinations.

The invention represents a modification of the valve assemblies used in manifold systems disclosed in U.S. Pat. No. 5,232,023 issued Aug. 3, 1993 and U.S. Pat. No. 5,450,878 issued Sep. 19, 1995.

It is common in the food packaging industry to have a need to connect a number of sources of a fluid, such as different types of milk or different types of soft drinks, to a number of different filler machines to fill containers, such as gallons, half-gallons, quarts and so on. To date these connections have been accomplished in the form of a manifold, including a number of lines from source tanks crossing a number of lines leading to filler machines, with valves being provided to control flow of fluid from any selected one or more of the source tanks to any chosen one or more of the filler machines. This arrangement creates a need for an extremely large number of valves, however. For instance, a single manifold connecting ten source tanks to ten filler machines, would use over a hundred valves to accomplish the control which is necessary and desired.

In the past, it has been conventional to use specially designed valves to control these manifolds, called block-and-bleed valves, sometimes called leak detector valves, with one such valve installed at each manifold intersection. Block-and-bleed valves are particularly applicable to the sanitary industry, because they permit control of flow of different types of fluids through the same valve with double protection against intermixing of those fluids. That is, it may be desirable to have chocolate milk flowing through one part of the valve and white milk through another part, or pasteurized milk through one part and raw milk through another part, or clean-in-place solution through one part and milk or another food fluid through another part. Clearly, it is critical that these fluids not be permitted to mix, and regulations require that even failure of a single seat or valve plug does not permit such mixing.

While valves used in the past functioned generally satisfactorily, they were extremely complex and expensive, and included multiple, coaxial, independently operable actuators and valve plugs. Under certain circumstances these valves were subject to substantial leakage and product waste, and when they did fail in this manner, while preventing mix of different fluids, their maintenance was difficult and expensive.

Even the improved systems heretofore devised have suffered from the problem that, once a valve becomes worn, the replacement of valve seats or valve plugs in a valve assembly is very time consuming and thus costly, both in terms of the cost of replacement parts and in terms of lost production due to lengthy down times during the repair process. In order to minimize down time it has been necessary to keep a large inventory of costly replacement assemblies on hand. A need has thus continued to exist for improved valve assemblies that are economical, readily repaired and which minimize waste of the fluids being conveyed.

SUMMARY OF THE INVENTION

The present invention provides a valve assembly useful in having manifold valve systems which provides individually controllable valve plugs having concentric stems and an annular ring on which valve seats are provided on each end and wherein the valve plugs and seats are removable as a single assembly. A drain or leak detector port is provided laterally to this assembly.

In accordance with one aspect of the invention, two valves are combined in a single valve housing and use independently controllable coaxial actuators while a third, leak detector valve is connected thereto by openings through the central portion of the valve seat ring and a short connecting conduit is configured so that liquid will drain by gravity from the valve assembly through the third valve to a drain which is open to the atmosphere. The invention also provides for independent control of the drain port that serves as the leak detector. An important aspect of the invention involves the use of concentrically configured or acoaxial actuator rods to enable independent control by means of independent actuators. Both actuators and valve assemblies along with the novel annular valve seat ring are readily removable as a single assembly for repair or replacement.

The invention further contemplates using one such two valve unit with a third inexpensive single actuator valve all combined together in a single subassembly to provide an inexpensive but effective valve assembly. An important advantage of the present invention results from the fact that independent control of three independently controllable valves enables closing of the inflow valve while the leak detector port remains closed to permit gravity draining of liquids out of the outflow valve, which remains open. After such draining is complete, the outflow valve can be closed and the drain port opened. Thus, no significant loss of fluid occurs when the valves are in motion. The valves of this invention are particularly effective in preventing the inadvertent mixing of different types of fluids, even on failure of one valve seat or valve plug.

An important advantage of the invention relates to the provision of an economical valve assembly that provides a leak detector, i.e., an opening to the atmosphere, which complies with applicable regulations governing equipment used in the dairy industry and yet avoids spillage of milk each time the leak detector is opened. In accordance with an important related aspect of the invention, cleaning of the valve assembly is facilitated by the fact that each valve in the assembly can be fully and adequately cleaned by virtue of the fact that each valve stem in the system can be fully extended and retracted for purposes of cleaning. This assures adequate cleaning of the valve parts and associated O-rings or similar seals.

Briefly summarized, the invention provides a valve assembly which includes a valve body formed of a cylinder having upper and lower ends with an inlet port at one end, an outlet port on an opposite end and at least one side outlet port. An annular ring element has upper and lower ends on which are formed upper and lower valve seats, respectively, the ring being sealed around its periphery on each end to the valve body. A central portion of the ring connecting the upper and lower ends has at least one and preferably about 6 to 8 openings therethrough in fluid flow communication with the side outlet port.

An actuator assembly fitted in the cylinder includes actuators, concentrically fitted actuator rods valve stems and valve plugs for opening and closing the two valve ports by engaging the valve seats on opposite sides of the ring. The rod for the upper valve seat is in the form of a hollow cylinder concentric and coaxial with the actuator rod for the lower seat, the first and second rods being independently actuatable. An independently controllable actuator assembly in the side outlet port includes a valve actuator, an actuator rod attached to and a valve plug for closing the outlet port. The outlet port, when open is in flow communication with a drain open to the atmosphere whereby liquids can be drained by gravity from the space between the annular ring and the cylinder when the side outlet is open. The actuator assembly including the annular valve seat ring is removable as a unit from the cylinder for repair or replacement.

Other objects and advantages of the invention will become apparent hereinafter.

BRIEF DESCRIPTION OF THE DRAWINGS

FIG. 1 is an elevational fragmentary partially cross sectional view of a valve assembly connected to a manifold assembly and constructed according to one embodiment of the invention;

FIG. 2 is a perspective view showing a valve seat ring member of the invention with parts shown in cross section;

DETAILED DESCRIPTION OF THE INVENTION

Figure 3:
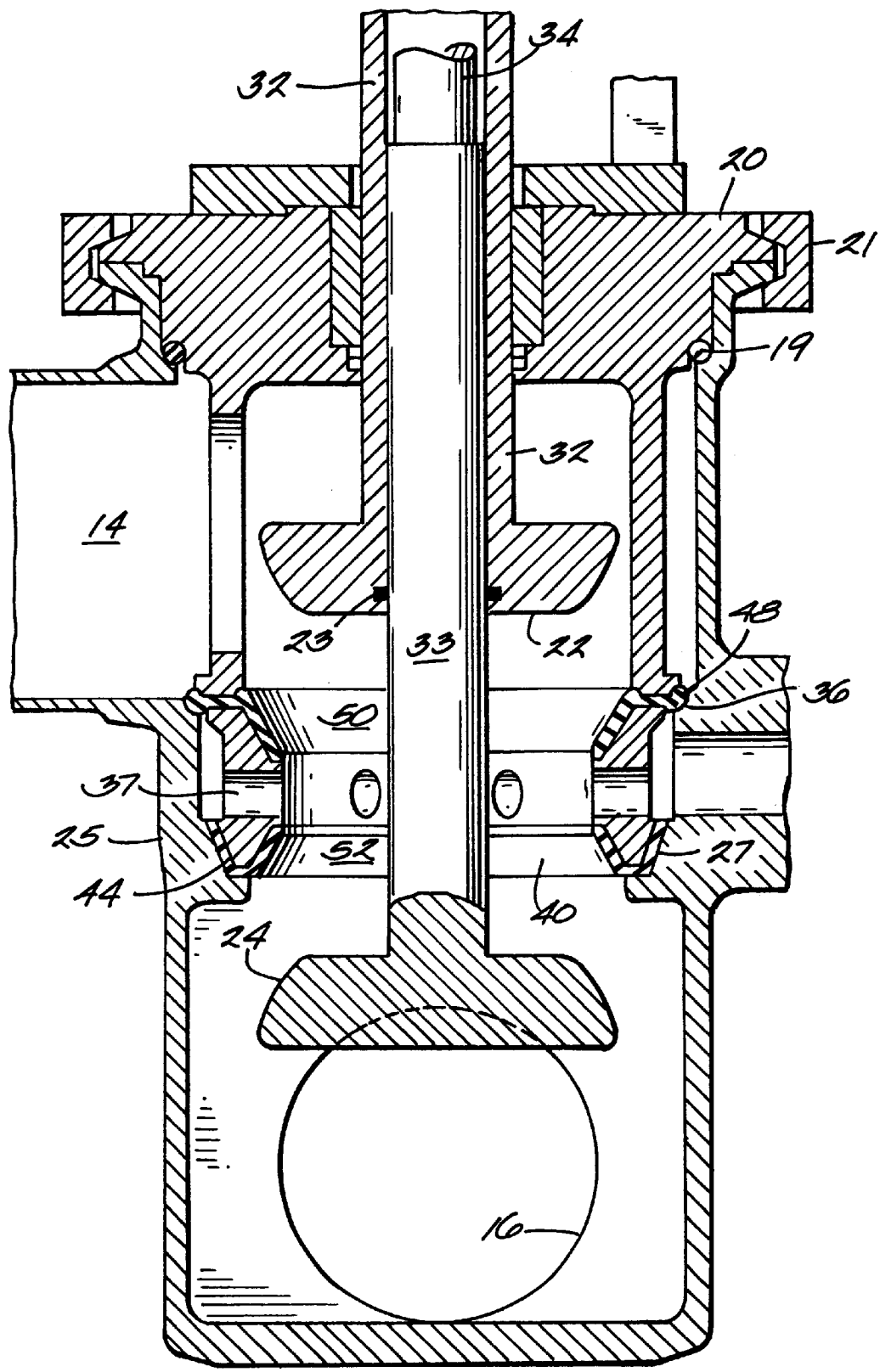
FIG. 3 is an enlarged fragmentary elevational cross sectional view of the valve assembly of FIG. 1.

Referring now to FIG. 1, there is shown a valve assembly 12, suited for use in manifold valve assemblies such as those shown in greater detail in U.S. Pat. No. 5,441,079. The valve assembly 12 is connected to and receives supply from a source conduits 14 which may be connected to such supply sources as tanks of fluid. Valve assembly 12 is also connected to and supplies the fluid to a number of destinations such as filler machines for filling containers with one or more of the fluids from the fluid supply tanks through outlet conduits 16. The purpose of the valve assembly 12 is to control and selectively permit the flow of fluid from one or more predetermined sources 14 to a predetermined destination 16. The manifold assembly includes one supply tube 14 for each fluid supply source, and one delivery tube 16 for destination . While the valve assembly 12 shown in FIG. 1 is fragmentary, it will be understood that the invention may be applied to any number of fluid supplies and destinations.

As known to those skilled in the art, the manifold assembly results in a crossed pattern of supply tubes 14 and delivery tubes 16. The supply tubes 14 and delivery tubes 16 do not actually intersect, but rather are positioned in parallel sets and in parallel planes, with the supply set being in the upper plane and the delivery set being in the lower plane. According to the embodiment of the invention shown in the drawings, the delivery tubes 16 are positioned in a plane beneath the plane of the supply tubes 14 so that fluids will tend to drain toward the delivery tubes by gravity flow. One manifold valve assembly 12 is provided at each crossing point of a supply tube 14 with a delivery tube 16.

Each valve assembly 12 includes three separate valve plugs, a supply valve plug 22 a delivery valve plug 24 and a drain port or "leak detector" valve plug 29. In the arrangement of FIGS. 13 the valve plugs 22 and 24 are positioned at opposite sides of a valve cylinder or housing 25. Each of these valve plugs 22, 24 and 29 is supplied with its own actuator assembly 26, 28 and 30, respectively. As also shown in FIG. 1, valve plugs 22 and 24 are interconnected by coaxial valve stems and linearly aligned with each other. The valve stems are mounted centrally of a bonnet 20 which is secured to valve body 25 by means of clamps 21, O-rings 19 being provided for a fluid tight seal. Sealing means, such as an O-rings 23 can be provided where needed in the valve stem assembly also to ensure against leakage. Valve plug 29 is operates to open and close a port 35 in the side of valve cylinder 25.

As further seen in FIG. 1, the delivery tubes 16 are connected to the bottoms of valve body 25. Thus liquids will flow by gravity through the valve assembly toward the delivery tubes 16.

The interior detail of each valve body can be best seen by reference to FIGS. 1 and 3. Supply valve plug 22 is connected to its own actuator 26, having a hollow annular actuator rod 32, actuatable between open and closed positions. Valve plug 22 has, at its top, a pass-through section as described in the above referenced '023 and '878 patents, which permits flow of fluid from upstream valves at all times regardless of whether valve 22 is open or closed. The valve body 25, bonnet 20 and annular ring member 40 are shown in separated condition in FIG. 4 without the valve plugs or stems for the sake of further clarity.

As shown in FIGS. 13 and best seen in FIG. 2, an annular ring member 40 is positioned within the valve housing 25 between inlet 14 and outlet 16. As seen in FIG. 2 annular member 40 is preferably formed of a metal ring structure 42 to which upper and lower elastic surface layers 44 and 46 are coated or adhered. The upper elastic member 46 has a circular lip 48 around its outer perimeter which serves to seal the annular ring member 40 against a surface 36 of valve housing 25. Lower elastic member 44 has an outer surface 47 which sealingly engages a shoulder 27 of valve housing 25. It will be noted that the shoulders 36 and 27 are configured in a manner which permits removal from the valve housing 25 of the entire actuator assembly, including ring 40 as a single unit.

Annular member 40 provides upper and lower valve seats 50 and 52 which are adapted to be closed by valve plugs 22 and 24, respectively. The valve plugs 22 and 24 are in this embodiment formed of a rigid material, usually, metal. Between the valve seats 50 and 52 is a central portion 54 of the annular ring member 40. Central portion 54 has a plurality of openings 56 around its perimeter which communicate with a flow passage 37 which connects to port 35. The flow passage 37 is defined by the interior of valve chamber 25 and the interior of ring 40 which are fluid tight except for openings 56.

As seen in FIG. 1 when the valve 29 is open, flow through the openings 56 through passage 37 and port 35 occurs by gravity, allowing fluid flow out through a discharge drain 31 which is open to the atmosphere. Thus, when valve plugs 22 and 24 are both in the closed position, if any fluid inadvertently leaks from either the vicinity of inlet conduit 14 or the outlet conduit 16 into the space between the valve seats 50 and 52, the leaked fluids flow out of the discharge port 31, which thus serves as a leak detector.

Valve plug 24 is attached to the end of valve stem 33 which is in turn attached to actuator rod 34. Plug 24 is provided to close valve seat 52 at the bottom of annular ring 40. The actuator 28 has two positions, one where the port formed by seat 52 is open and the other where the port is closed.

As also best seen in FIG. 1, valve 29 is also a simple actuator type valve operated by actuator 30 so as to close side drain port 35.

Figure 4:
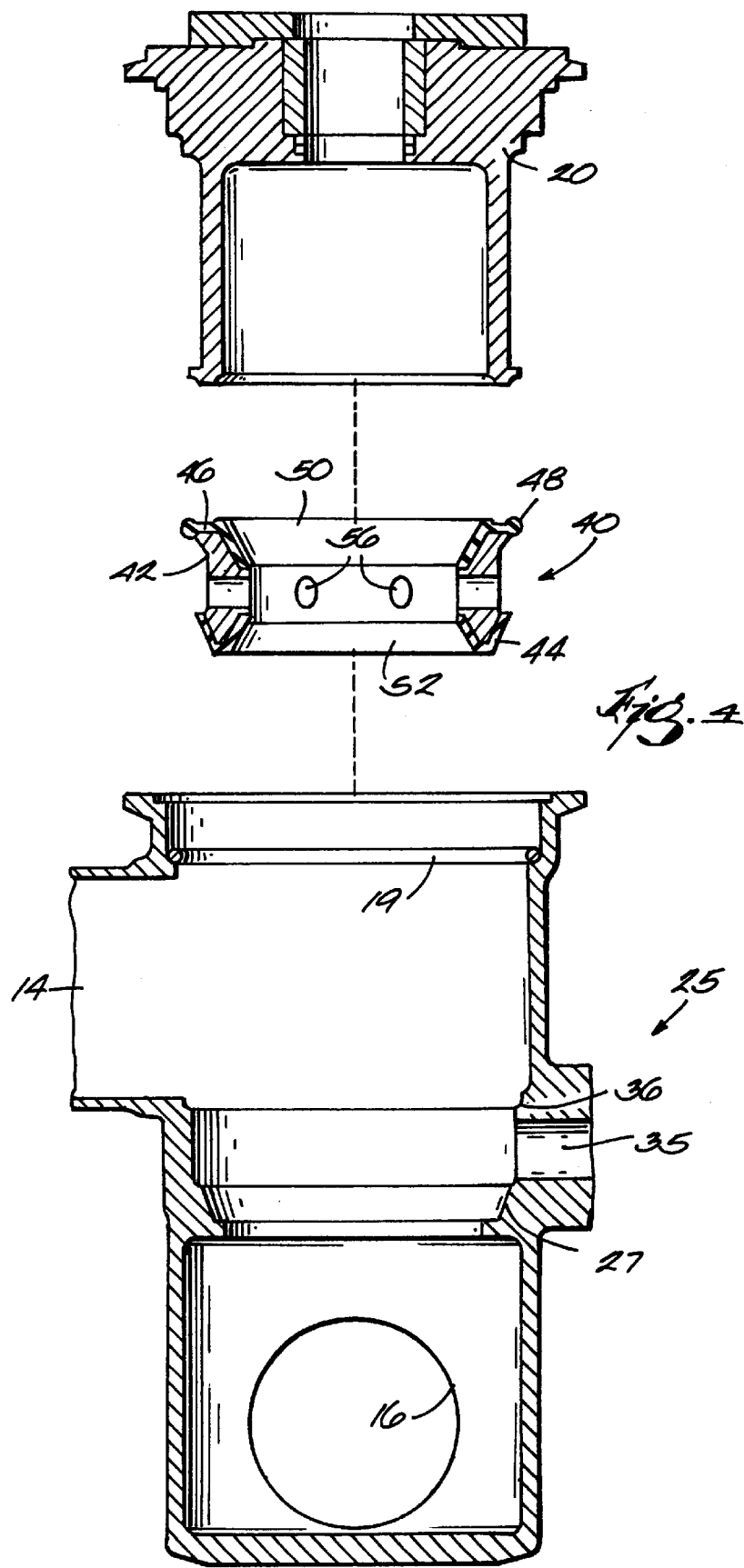
FIG. 4 is an enlarged fragmentary cross sectional view of the disassociated valve body and the valve seats of the assembly of FIG. 3.
Figure 5:
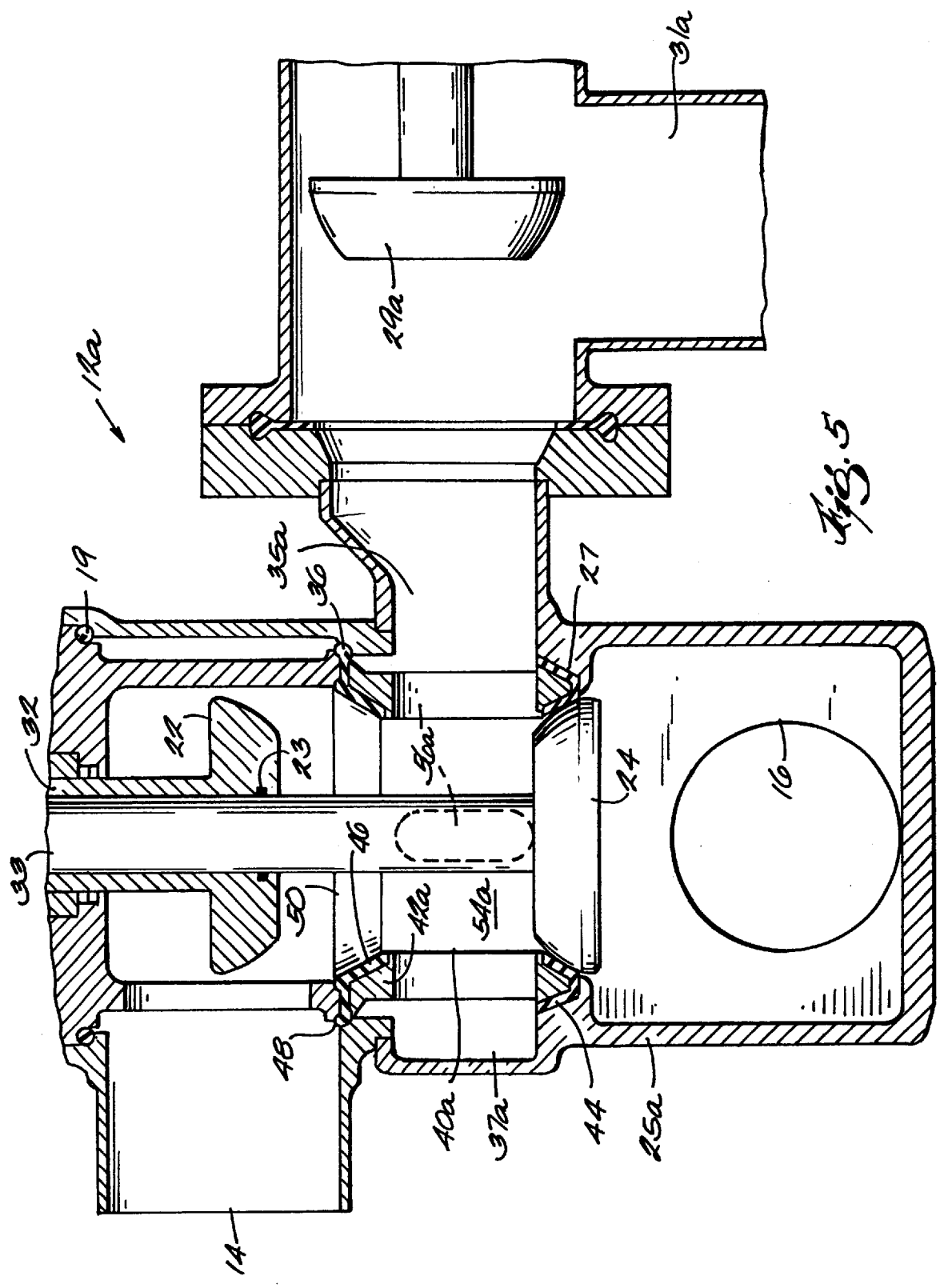
FIG. 5 is an enlarged fragmentary elevational cross sectional view of a valve assembly in accordance with a modified embodiment of the invention; and, FIG. 6 is a fragmentary vertical cross sectional view illustrating a further embodiment of the invention.

A modified form of the valve assembly 12A of this invention is seen in FIG. 5. Components having the same numbers as those which were assigned to similar components in FIGS. 1 4 are substantially the same and the descriptions thereof will not be repeated here.

In the embodiment of FIG. 5 the fluid flow channels are shown as being enlarged in order to handle the flow of, and meet governmental requirements regarding dairy products. In order to function satisfactorily, in accordance with governmental regulations, the total cross-sectional area the openings 56a must exceed the cross-sectional area of the port 35a. In this case the annular ring member 40a is of a substantially greater height, notably, in the central section 54a thereof. This enables provision of larger openings 56a for escape of fluids through port 35a. An appropriately configured valve plug 29a is provided to open and close port 35a to provide flow when required through a leak detector port 31a. The valve housing 25a is also suitably configured to receive the larger ring member 40a which has a metal body 42a with a suitably modified configuration. The valve 12a thus has leak detector capacity of a substantially greater potential volume than that shown in the embodiment of FIGS. 1 4. In other respects the two embodiments are similar.

Figure 6:
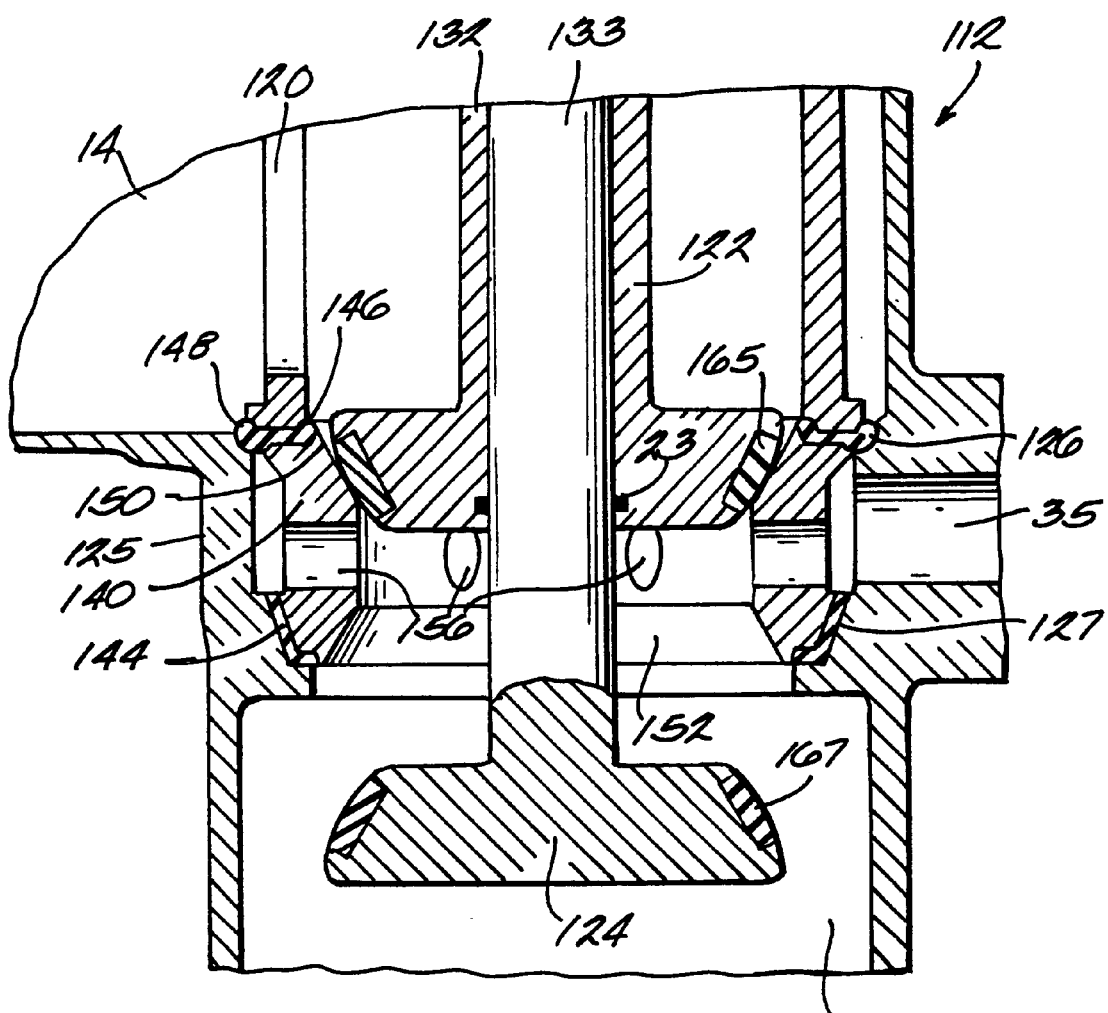

Still another embodiment of the invention is shown in FIG. 6. As shown, a valve assembly 112 is provided to control flow between inflow conduit 14 and outflow conduit 16. A side port 35 is also provided as in the case of the preceding embodiments. A pair of valve plug members 122 and 124 are mounted through a bonnet member 120 as in the case of the earlier embodiments. The valve plug members 122 and 124 are mounted on valve stems 132 and 133, respectively and are co-axially positioned as in the case of the earlier embodiments.

In the embodiment of FIG. 6 the plug and valve seat arrangements are modified. Thus, instead of a pair of valve seats which are surfaced by an elastomer as in the earlier described embodiments, the valve seats 150 and 152 provided on an annular ring member 140 are metal. In order to provide sealing the valve plug member 122 is provided with a rubber sealing surface 165. As shown, the rubber surface member is of a tapered ring configuration which can be molded into a recess around the perimeter of the valve plug member 122, as shown. A similar tapered ring shaped member 167 is provided on the lower valve plug 124, as also illustrated. It will be apparent in this embodiment that sealing of the valve port is accomplished by pressure between the valve plug rubber surface 165 and valve seat 150 and similarly between the rubber ring member 167 and valve seat 152.

As in the case of the previous embodiments a plurality of openings 156 is provided around the perimeter of the central portion of an annular valve seat ring member 140. This allows escape of leaking fluids out through port 35 as in the case of the earlier embodiments in the event of a leak. Also, the outer surfaces of the annular ring 140 are provided with an elastomeric layer 144 at the bottom and another layer 146 at the top in order to seal the ring against the interior of the valve housing 125. Also as in the case of the earlier embodiments a sealing rim 148 around the upper periphery of the annular ring member 140 is also provided for sealing purposes against the appropriately configured shoulder 126 of valve housing 125. A tapered shoulder 127 is provided in order to sealingly receive the elastomeric layer 144. The rubber components 144 and 146 can either bonded to the metal, coated thereon, or alternatively, simply frictionally held in the groove in the valve plug surface.

Each of the three valves of the assembly 12 can be individually controlled. In will be apparent that when supply valve 22 is open, delivery valve 24 is also open, and valve 29 is closed, that fluid can flow from supply tube 14 into delivery tube 16. Then, to discontinue the flow, valve 22 is closed while valve 29 remains closed for a time sufficient to allow gravity drainage of liquids remaining in the valve bodies through valve 24 into delivery tube 16. Subsequently, valve 24 is closed. Drain port valve 29 is then opened without consequential waste of liquid.

It will also be apparent that, as needed, the supply tubes can be cleaned and drained without affecting the delivery tubes, and vice versa. For example, valves 22 and 29 could be open and valve 24 closed so that the supply side is cleaned without affecting the delivery side, or vice versa.

The invention provides structure permitting easy removal of the actuator and valve stem assemblies as a unit. Since the actuators 22 and 24 together with their associated valve stems, rods and plugs and ring 40 can be installed or removed as a unit, a different such unit can be substituted with a minimum amount of down time whenever any of the components require repair or replacement. Note also that, in operation, port 35 can be closed by means of valve seat 29 prior to opening of ports 22 and 24. Thus no waste of fluid occurs when the valves are in motion.

It will be noted that each embodiment of the invention enables use of three simple single actuator valves to perform fluid flow control operations that often previously required costly and complex valves. Use of these valves in accordance with the invention still prevents the mixing of different types of fluids running through the same valve assembly, even on failure of one valve seat or valve plug.

While the apparatus hereinbefore described is effectively adapted to fulfill the aforesaid objects, it is to be understood that the invention is not intended to be limited to the specific preferred embodiment of valve assembly set forth above. Rather, it is to be taken as including all reasonable equivalents within the scope of the following claims.

What is claimed is:

1. A valve assembly, comprising:
  a valve body formed of a valve cylinder having an upper end and a lower end, an inlet port at one end thereof, an outlet port on an opposite end thereof aligned with said inlet port and at least one outlet port on a side thereof;
  an annular ring disposed between said valve cylinder upper end and said valve cylinder lower end having upper and lower ends, each of said upper and lower ends of said annular ring having upper and lower valve seats, respectively, and being sealed around its periphery to said valve cylinder;
  a central portion of said ring having an interior surface and an exterior periphery connecting said upper and lower ends of said ring, said central portion having at least one opening therethrough extending between said interior surface and said periphery and being in fluid flow communication with said side outlet port;
  an actuator assembly fitted in said cylinder including:
    first and second valve actuators,
    a first actuator rod attached to and actuatable by said first actuator, one end of said rod projecting outwardly from said actuator, a valve stem attached to the projecting end of said actuator rod and having a valve plug for opening and closing said lower valve seat, a second actuator rod attached to and actuatable by said second actuator, said second rod being in the form of a hollow cylinder concentric and coaxial with said first actuator rod, said first and second rods being independently actuatable by said first and second actuators, a hollow cylindrical valve stem attached to the projecting end of said hollow actuator rod and having a valve plug for opening and closing said upper valve seat, said valve plug having a central opening through which said first actuator is fitted, an independently controllable actuator assembly in said side outlet port including a valve actuator, an actuator rod attached to and actuatable by said actuator, one end of said rod projecting outwardly from said actuator, and a valve plug attached to the projecting end of said actuator rod for closing said outlet port, said outlet port, when open being in flow communication with a drain open to the atmosphere whereby liquids can be drained by gravity from the space between said ring and said cylinder when said side outlet is open.

2. A manifold valve assembly as recited in claim 1 wherein said inlet port is in fluid flow communication with a supply source and said outlet port is in fluid flow communication with a fluid distribution conduit.

3. A manifold valve assembly as recited in claim 1 wherein said actuators, valve assemblies and annular ring are all carried by a bonnet connectable to said valve cylinder and are all removable therefrom as a unit.

4. A manifold valve assembly as recited in claim 1 wherein a plurality of openings are provided through said central portion of said annular ring around the periphery thereof.

5. A manifold valve assembly as recited in claim 1 wherein said annular ring is formed of metal and has upper and lower surfaces which are surfaced by an elastomeric polymeric material.

6. A manifold valve assembly as recited in claim 5 wherein said elastomeric material comprises a rubber.

7. A manifold valve assembly as recited in claim 5 wherein said valve plugs have metal surfaces adapted to engage said valve seats.

8. A manifold valve assembly as recited in claim 1 wherein said valve seats comprise tapered metal surfaces and said valve plugs are provided with elastomeric material on surfaces which engage said valve seats.

9. A manifold valve assembly as recited in claim 1 wherein said ring has between 6 and 8 openings around its perimeter.

10. A manifold assembly, comprising a plurality of valve assemblies each of which comprises:

a valve body formed of a valve cylinder having an upper end and a lower end, an inlet port at one end thereof, an outlet port on an opposite end thereof aligned with said inlet port and at least one outlet port on a side thereof;

an annular ring disposed between said valve cylinder upper end and said valve cylinder lower end having upper and lower ends, each of said upper and lower ends of said annularing having upper and lower valve seats, respectively, and being sealed around its periphery to said valve cylinder;

a central portion of said ring having an interior surface and an exterior periphery connecting said upper and lower ends of said ring, said central portion having at least one opening therethrough extending between said interior surface and said periphery and being in fluid flow communication with said side outlet port;

an actuator assembly fitted in said cylinder including:
first and second valve actuators,
a first actuator rod attached to and actuatable by said first actuator, one end of said rod projecting outwardly from said actuator, a valve stem attached to the projecting end of said actuator rod and having a valve plug for opening and closing said lower valve seat, a second actuator rod attached to and actuatable by said second actuator, said second rod being in the form of a hollow cylinder concentric and coaxial with said first actuator rod, said first and second rods being independently actuatable by said first and second actuators, a hollow cylindrical valve stem attached to the projecting end of said hollow actuator rod and having a valve plug for opening and closing said upper valve seat, said valve plug having a central opening through which said first actuator is fitted, an independently controllable actuator assembly in said side outlet port including a valve actuator, an actuator rod attached to and actuatable by said actuator, one end of said rod projecting outwardly from said actuator, and a valve plug attached to the projecting end of said actuator rod for closing said outlet port, said outlet port, when open being in flow communication with a drain open to the atmosphere whereby liquids can be drained by gravity from the space between said ring and said cylinder when said side outlet is open, said outlet ports being configured so that liquids will drain by gravity from the lower end of said cylinder into either one of said outlet ports when the other of said outlet ports is closed.

11. A manifold assembly according to claim 10 wherein one of said outlet ports is located in the bottom of said cylinder.

12. A manifold assembly according to claim 10 wherein said coaxial valves include a bonnet affixed to the actuators thereof, said bonnet being insertable into the inlet end of said valve cylinder and carrying said valve stems and plugs on opposite sides of said ring whereby said coaxial valves and said ring can be removed from said assembly as a unit.

13. A manifold assembly as recited in claim 12 wherein said bonnet includes a cage portion positioned in a pass-through area adjacent to said inlet, so as to continuously permit flow through the bonnet, said cage portion supporting a valve seat fitted to the inlet valve plug.

14. A manifold assembly as recited in claim 12 further comprising sealing means positioned between said bonnet and said valve body.

15. A manifold assembly as recited in claim 11 wherein said side outlet is positioned so that liquid surrounding said ring will drain by gravity into said outlet when the inlet valve and outlet valves are both closed.

16. A manifold assembly as recited in claim 10 wherein the outlet port at the bottom of said cylinder is connected to a fluid distribution conduit and the outlet on the side of said cylinder discharges to the atmosphere when it is open.

* * * * *

UNITED STATES PATENT AND TRADEMARK OFFICE
CERTIFICATE OF CORRECTION

PATENT NO. : 6,293,300 B1
DATED : September 25, 2001
INVENTOR(S) : Robert A. Dumke and Robert D. Zimmerly It is certified that error appears in the above-identified patent and that said Letters Patent is hereby corrected as shown below:

Column 6,
Line 52, delete "of said annular ring"

Column 7,
Line 59, delete "of said annularing".

Signed and Sealed this

Twenty-seventh Day of July, 2004

JON W. DUDAS
*Acting Director of the United States Patent and Trademark Office*